UNITED STATES PATENT OFFICE.

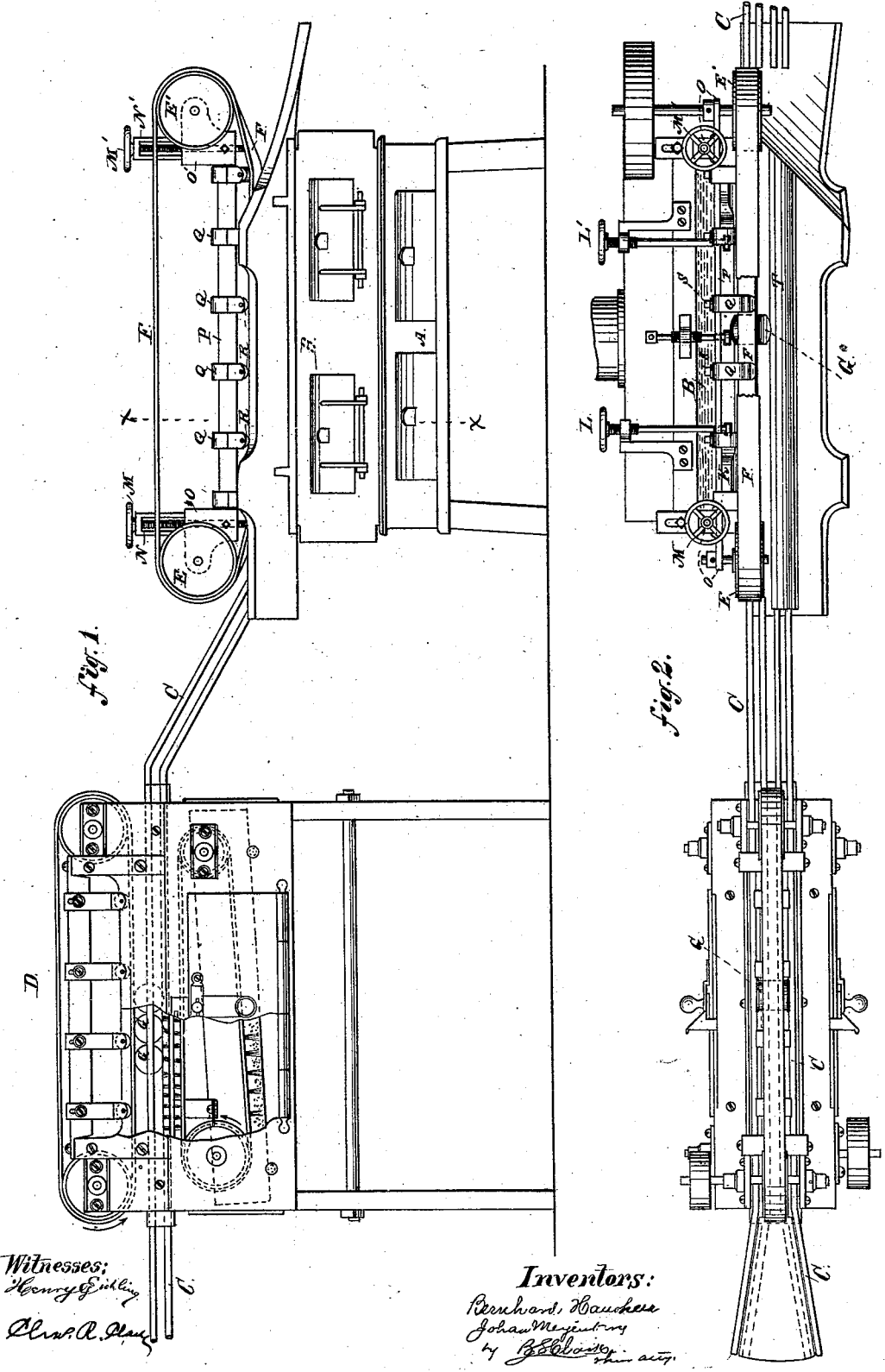

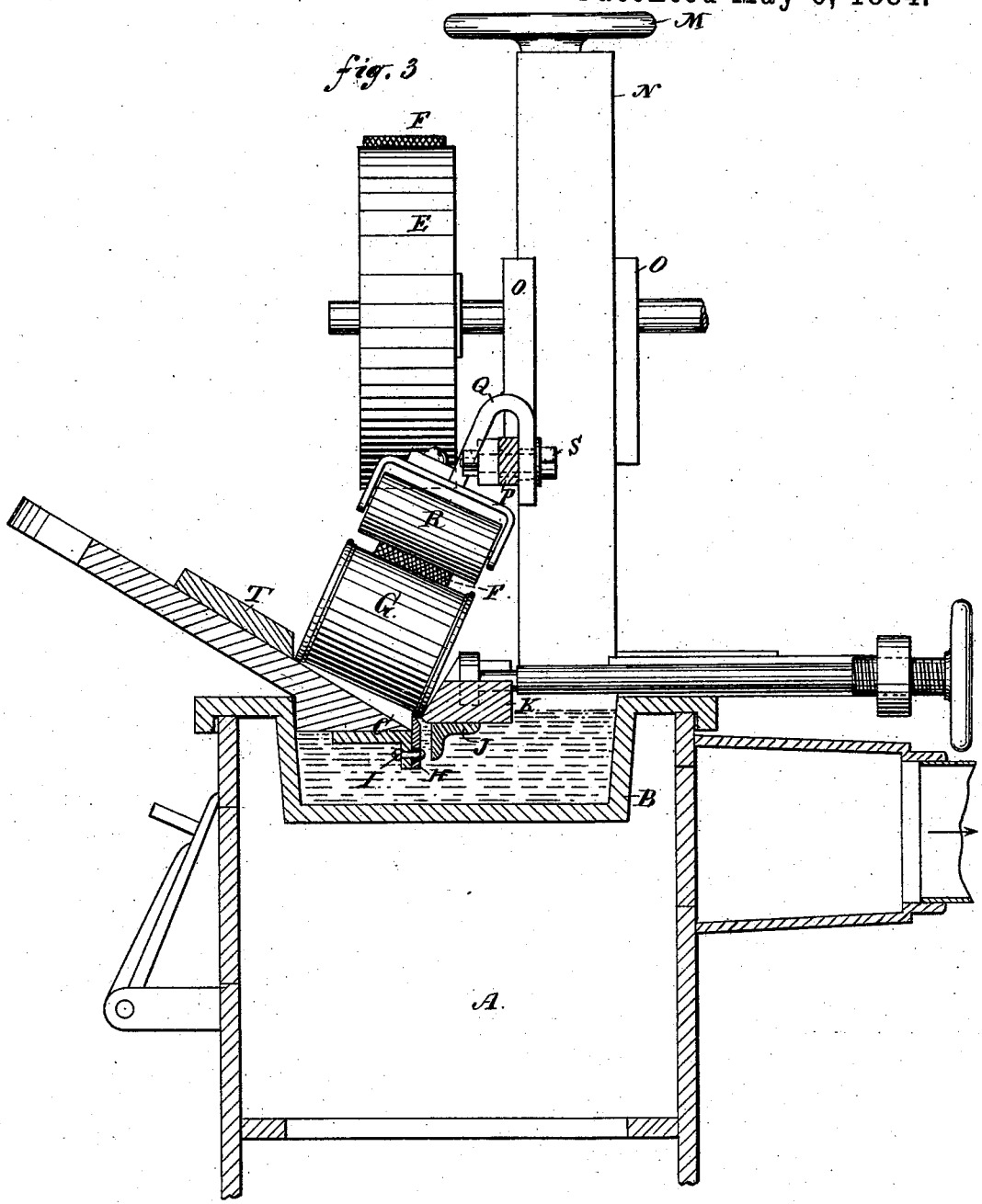

BERNHARD HAUSHEER AND JOHAN MEŸENBERG, OF CHAM, SWITZERLAND, ASSIGNORS TO DAVID S. PAGE, OF NEW YORK, N. Y.

SOLDERING-MACHINE.

SPECIFICATION forming part of Letters Patent No. 297,993, dated May 6, 1884.

Application filed March 15, 1884. (No model.) Patented in Germany February 19, 1881, No. 16,225.

*To all whom it may concern:*

Be it known that we, BERNHARD HAUSHEER and JOHAN MEŸENBERG, citizens of Cham, in the Republic of Switzerland, and residing in said Cham, Switzerland, have invented certain new and useful Improvements in Soldering-Machines; and we do hereby declare that the following is a full, clear, and exact description thereof, and will enable others skilled in the art to which our improvements belong to practice the same.

Our invention relates to that class of soldering-machines in which the articles to be soldered are automatically passed along a track over a soldering-bath, the seams to be sealed being brought in contact with the solder in the bath during their passage; and our invention consists of devices whereby various difficulties experienced in the use of machines of this description are overcome. Thus in these machines the seam to be soldered is dipped in the molten tin as the can or other article travels along the track over the bath, which causes other portions of the surface of the article to also be smeared with patches of tin, and results in a large percentage of waste and work of inferior appearance; and we reduce this waste to a minimum and produce work of improved finish by our first feature of invention, which consists of a soldering-tool properly supported in relation to said track, and arranged to apply the solder uniformly and in suitable quantity directly to the seams to be closed. Again, the scum and ashes which necessarily accumulate on the surface of the molten metal in the bath prevent the even application of the tin to the seams; and we obviate this objection by our second feature of invention, which is to extend the soldering-tool and the devices that regulate the supply of solder to the same beneath the surface of the molten tin, in order to secure a flow of the solder to the edge of the soldering-tool, which shall be both free from foreign matter or slag, and of constant temperature.

In machines embodying our improvements it is desirable to have the parts adjustable for the purpose of adapting them to the various sizes of cans; and our fourth and fifth features of invention are embodied, respectively, in a movable guide for adjusting the article to be soldered with reference to the soldering-tool, and in mechanism for adjusting the transmitting devices in reference to the track.

In the drawings accompanying this specification, Figure 1 is an elevation of a machine embodying our invention. Fig. 2 is a plan view of the same, and Fig. 3 is an enlarged cross-section on the plane *x x* of Fig. 1.

Referring to these views in detail, A is a furnace, the walls of which constitute supports for the solder pan or bath B, and the transmitting and soldering devices. C is a track extending from a resining-machine, D, (the component parts and operation of which will be described in another application,) to and through the soldering-machine, and upon which the articles to be soldered are supported and moved, and E E' are pulleys carrying an endless belt, F, arranged to impel the cans G or other articles along the track C.

The bath B, which contains the solder, is of a trough-like form, and is sufficiently deep to hold such a quantity of the molten metal as can be resupplied while feeding the soldering device without effecting any material change in temperature, and the solder in this bath is maintained at the proper temperature by the furnace A, suitably furnished with heat-regulating devices.

H is a soldering-tool adjustably attached to the edge of the track C by means of bolts I, and of a length equal at least to the circumference of the largest size of cans. It is brought to a sharp angle at its working-edge, as shown, and this angular edge curves slightly upward from each end of the iron to the middle thereof, so that along its whole length it is the same distance from the surface of the molten solder, which under the action of the heat assumes a slightly elliptical shape, and this tool is polished and tinned on the side in contact with the solder so that the solder may readily adhere to it; but upon the side next the track C it is coated with a film of glue, to stop the spread of the solder beyond its edge, and the adjacent part of the track is similarly protected with iron putty, which prevents any solder that may leak through from adhering thereto.

K is a guide, the office of which is to act as a bearing for the ends of the cans and cause them to take such a position that the seam to be closed will follow along the soldering-tool. It is mounted on the beam J, and is rendered adjustable by the hand-screws L L', fixed to the frame of the machine, to accommodate flanges of various depths on the cans of different sizes, and also to govern the flow of the solder to the soldering-iron. The soldering-iron and this guide are arranged to extend below the surface of the solder, as shown, and by this arrangement of these parts the soldering-tool takes its feed from below the surface of the molten mass; and since such feed is regulated according to the distribution of the solder, only pure tin is used, and no opportunity exists for the formation of tin ashes while the machine is in operation.

The endless belt F, which rolls the cans along the track, is made adjustable for different sizes of cans by means of the head-screws M M' which are fixed to the uprights N N', and have the guide-blocks O O', carrying the pulleys E E', mounted on their threaded shafts, so that the turning of these hand-wheels will cause the belt to approach or recede from the track. The guide-blocks O O' support a beam, P, to which the angle-arms Q, having rollers R, are adjustably secured on nuts S. These rollers are to direct the transmitting-belt to bear upon the cans being soldered, so that they may be kept in constant and regular motion while in contact with the soldering-tool. As the cans leave the resining mechanism and enter the soldering-machine, they are slightly tipped or canted by the inclination of the track C, and their inner ends brought to bear against the guide K, which causes the flanges on such ends to be inserted between the soldering-tool and this guide. This brings the edge of the soldering-tool against the open seam, and the forward movement of the can presents the seam along its entire length to the action of such tool, whereby the seam is cleanly and effectively sealed.

That the cans while being operated upon may be yet more securely held in position, we provide the track C with a guide-bar, T, which can be moved toward or from the soldering-tool as the length of the cans require, and which prevents any possible displacement of the cans from causes not governed by the other devices.

We do not claim any part of the resining apparatus herein shown, having applied for a separate patent on the same, and as it is claimed and set forth in Serial No. 124,340, filed March 15, 1884, we disclaim so much in this application.

What is claimed as new is—

1. The combination, in a soldering-machine, of a solder bath, a track extending over such bath adapted to guide the articles to be soldered, and a soldering-tool arranged in the path of said articles for applying solder thereto.

2. The combination, in a soldering-machine, of a solder bath, a track extending over such bath adapted to support and guide the cans or other articles to be soldered, an endless band for impelling the cans along said track, and a soldering-tool arranged in the path of the cans or other articles for distributing the solder thereupon.

3. The combination, in a soldering-machine, of a solder bath, a guide or track for the cans extending over said bath, and a soldering-tool arranged to take the solder for soldering said cans from below the surface of said bath.

4. The combination, in a soldering-machine, of a solder bath, a track arranged over said bath to support the cans, a soldering-tool for applying the solder, and an adjustable guide for regulating the position of said cans with reference to said tools, substantially as described.

BERNHARD HAUSHEER.
JOHAN MEŸENBERG.

Witnesses:
HEINRICH WISS, Sohn,
GOTTLIEB KOST.